United States Patent Office 3,294,660
Patented Dec. 27, 1966

3,294,660
AMORPHOUS ZINC OXIDE SEMICONDUCTOR
AND METHOD OF MAKING
William D. Kingery, Lexington, Mass., and Reid A. Mickelsen, Bellevue, Wash., assignors to the United States of America as represented by the United States Atomic Energy Commission
No Drawing. Filed Sept. 30, 1964, Ser. No. 400,606
7 Claims. (Cl. 204—192)

The present invention relates to new and improved semiconductors and methods of making the same.

For a variety of electronic and other devices semiconducting materials have found a wide application both in bulk and as thin films. Frequently it is desirable to prepare these materials in a highly pure form so that dopants can be added to them to achieve particular characteristics.

It is an object of this invention to provide a new class of solid amorphous oxide semiconductors characterized by a substantially increased energy gap between the valence and conduction bands. Such semiconductors are characterized by a smaller intrinsic conductivity and retain their short range order; the long range order of the normal crystalline state not being achieved. Semiconductors made in accordance with this invention are capable of use to higher temperatures than is possible with conventional crystalline semiconductors.

It is a further object of this invention to provide a method of making such semiconductors, with specific reference to preparing amorphous ZnO semiconducting films and powders characterized by a substantially enhanced energy gap between the valence and conduction bands.

In general these materials are prepared by vapor phase deposition on a relatively low temperature substrate. Vaporization can be achieved thermally by direct evaporation, by electron beam evaporation, and cathodic sputtering such as reactive sputtering.

It is essential that the vapor phase be deposited on a low temperature substrate; that is, the substrate temperature must be low compared with the melting point of the material. For zinc oxide substrate temperatures below $-45°$ C. are required, whereas for aluminum oxide temperatures below $+100°$ C. are satisfactory inasmuch as $Al_2O_3$ is much more refractory than ZnO.

When prepared by deposition on a low temperature substrate, the solid retains its short range order, but the long range order of the normal crystalline state is not achieved. As a result the material has a lower density and a lower dielectric constant than the crystalline solid of the same composition. Since the energy required to put electrons into the conduction band is inversely proportional to the dielectric constant squared, the number of conduction electrons present at any given temperature are reduced. The material thus has a reduced intrinsic conductivity.

We have found that the temperature of the substrate can be regulated so that the final product is in the form of a continuous film or a powder. Thus ZnO films deposited on fused quartz slides maintained at temperatures between $-90°$ C. and $-45°$ C. remain coherent when warmed to room temperature. If the substrate is held at a temperature below $-90°$ C. however, the film will shatter into small particles when warmed to room temperature.

The invention may be more fully understood by reference to the following specific examples:

Sample preparation

Two different types of ZnO thin film samples were prepared. For optical absorption and electrical conductivity measurements, a thin continuous, and coherent film was desired. Conversely, index of refraction, X-ray and electron diffraction determinations required a sample which consisted of small particles which were obtained by the shattering of a thin film. Both samples were produced by reactive sputtering.

While other methods of deposition of films on substrates may be used, we prefer reactive sputtering for the preparation of ZnO films. By "reactive sputtering" we refer to sputtering which is accompanied by a chemical combination of the cathode material with the gas molecules used in the process.

Reactive sputtering offers several advantages over normal thermal evaporation for making oxide films. Thus, many oxides cannot be transported under high vacuum conditions normally present in thermal evaporation processes, without some degree of dissociation. ZnO, CdO, NiO and $Cu_2O$ are oxides of this type. Also, reactive sputtering permits the substrate to be maintained relatively cool, i.e., below $100°$ C., which is of vital importance to the production of amorphous materials by the present method.

In preparing samples, a reagent grade zinc metal cathode was employed.

The sputtering chamber was evacuated to less than $0.01\mu$ of mercury by means of a mechanical forepump and an oil diffusion pump. A liquid nitrogen cooled baffle was inserted into the pumping system to prevent backstreaming of oil into the sputtering chamber.

Following chamber evacuation, a substrate was cooled by liquid nitrogen. By using a substrate consisting of a fused quartz slide cooled to below $-90°$ C., or a polished brass plate cooled to liquid nitrogen temperature, a film was deposited which, when permitted to warm to room temperature, shattered into small particles.

If the film was deposited at a substrate temperature of between $-45°$ C. and $-90°$ C., a continuous coherent thin film of amorphous ZnO was formed. Hence, by control of substrate temperature one can produce either a thin film or a fine powder of amorphous ZnO. Deposits at substrate temperatures above $-45°$ C. were partly or wholly crystalline.

After the substrate was cooled to the desired temperature, a reactive gas mixture of oxygen and argon was introduced into the sputtering chamber. A 50/50 mixture of oxygen and argon was used. Before entering the chamber the two gases were mixed in a large glass container and dried with anhydrous magnesium perchlorate. The pressure in the chamber was increased to approximately $50\mu$ by means of a gas inlet valve to provide a suitable glow discharge.

Satisfactory sputtering rates were obtained by applying a voltage drop of 1.0 kv. and a current of 50 ma. between the electrodes. The anode probes were located approximately 1¾″ above the zinc cathode.

After a 15-minute sputtering period an oxide film about 1000 A. in thickness as determined by the Tolansky interferometer method was deposited on the substrate. If longer periods were used the cathode became deeply pitted and the oxide film took on a more metallic appearance. During the film deposition period the gas pressure was slowly increased to $70\mu$. The increase was necessary in order to keep the initial power settings. This effect is believed to be due to the oxidation of the zinc cathode which consequently reduces the effective sputtering capability. At the end of the film deposition period, the cathode was coated with a dark brown adherent film, lending support to the foregoing explanation.

Following film deposition the gas flow was stopped and the sputtering chamber was again pumped down to $0.01\mu$ of mercury. The cold film was then allowed to warm to room temperature. Air was subsequently admitted to the chamber and the coated glass slide or the particles were removed. The particles remained very loosely attached to brass substrates and could easily be scraped off after the probe had been taken out of the vacuum chamber.

*Effect of substrate temperature*

In order to determine the effect of the temperature of the substrate on the ZnO condensed thereon, experiments were conducted in which the substrate was held at liquid nitrogen temperature, −90° C., −45° C., 0° C. and +30° C. X-ray and electron diffraction patterns of the ZnO showed that if the substrate was cooled to −90° C. to −45° C., the spectra related to amorphous zinc oxide were observed. At 0° C. the measured absorption curve indicated the presence of the spectra of both amorphous and crystalline zinc oxide. At +30° C. the spectrum of crystalline zinc oxide appeared. It was concluded that the temperature of the substrate controls the structure of the deposited ZnO film.

*Effect of subsequent heating of the ZnO*

An amorphous ZnO film produced by condensation on a quartz substrate maintained at a temperature of −90° C. was examined in its original untreated state and again following heating for two minutes at temperatures ranging from 75° C. to 500° C. X-ray and electron diffraction patterns showed that between 75° and 100° C. the structure of the ZnO transformed from the amorphous to the crystalline state. This transformation was confirmed by optical absorption spectra and electrical conductivity variations.

*Properties of amorphous ZnO*

Extensive studies of amorphous ZnO produced by the method of this invention showed no difference in properties between ZnO films and finely divided ZnO particles, irrespective of whether the ZnO was initially condensed on a quartz or a metallic substrate.

As a result of index of refraction measurements, X-ray and diffraction patterns, optical absorption measurements and electrical conductivity tests, the properties of amorphous ZnO produced by this invention compared with those of crystalline ZnO as shown in the following table:

| Property | Amorphous ZnO | Crystalline ZnO |
|---|---|---|
| Optical band gap energy, e.v. | 5.4 | 3.2 |
| Index of refraction | 1.76±0.01 | 2.01 |
| Density, gm./cm.$^3$ | 4.6 | 5.6 |

Additionally, it was observed that the D.C. conductivity of the amorphous ZnO was approximately ⅕ that of the ZnO in the crystalline state.

The most significant and surprising property of amorphous ZnO made by the method of this invention is the magnitude of the shift in band gap energy from 3.2 e.v. for the crystalline state to 5.4 e.v. for the amorphous state. This substantial increase permits use as a semiconductor to higher temperatures and with a smaller intrinsic conductivity.

While the invention is typified with specific reference to the preparation of amorphous ZnO, it is equally applicable to the production of other semiconducting oxides in the amorphous state. Among these are: aluminum oxide, $Al_2O_3$; cadmium oxide, CdO; cuprous oxide $Cu_2O$; and nickelous oxide, NiC by vapor deposition on a substrate which is cool with respect to the melting point of the particular oxide.

We claim:
1. The method of producing an amorphous semiconducting film of zinc oxide that comprises the steps of providing a substrate, maintaining the substrate at a temperature between −90° C. and −45° C., vapor depositing a film of zinc oxide on said substrate by reactive sputtering using a zinc metal cathode and an atmosphere consisting of a mixture of oxygen and an inert gas, and permitting the film to warm to room temperature.
2. The method of claim 1 wherein the gas used in the reactive sputtering step consists of equal parts of argon and oxygen maintained at a pressure of between about 50μ and 70μ of mercury during sputtering.
3. The method of claim 2 wherein the sputtering step is continued for approximately 15 minutes to produce an amorphous film approximately 1000 A. thick.
4. The method of producing amorphous semiconducting zinc oxide in finely divided form that comprises the steps of providing a substrate, maintaining the substrate at a temperature between −90° C. and the temperature of liquid nitrogen, reactively sputtering a film of amorphous zinc oxide on the substrate, removing the film and substrate, and causing the zinc oxide film to shatter into a finely divided form by warming the film to room temperature.
5. The method of claim 4 wherein the reactive sputtering step consists in the use of a zinc metal cathode in an atmosphere consisting of a mixture of oxygen and an inert gas.
6. The method of claim 5 wherein the gaseous atmosphere in the reactive sputtering step consists of equal parts of argon and oxygen held at a pressure between about 50μ and 70μ for a period sufficient to produce an amorphous zinc oxide film in the substrate.
7. An amorphous zinc oxide semiconducting material prepared by reactive sputtering zinc in an oxygen-containing atmosphere onto a cooled substrate, said material characterized by a band gap energy of 5.4 e.v.; an index of refraction of 1.76 ±0.01; a density of 4.6 gm./cm.$^3$ and a D.C. electrical conductivity approximately one-fifth that for crystalline zinc oxide.

References Cited by the Examiner
UNITED STATES PATENTS

| | | | |
|---|---|---|---|
| 2,441,217 | 5/1948 | Beach | 117—106 |
| 2,825,687 | 3/1958 | Silvey et al. | 204—192 |
| 2,917,442 | 12/1959 | Hanlet | 117—201 |
| 3,039,896 | 6/1962 | Van Cakenberghe | 204—192 |
| 3,079,993 | 3/1963 | Sweet | 23—294 |
| 3,142,586 | 7/1964 | Colman | 117—106 |

JOHN H. MACK, *Primary Examiner.*

R. K. MIHALEK, *Assistant Examiner.*